Figure 7:
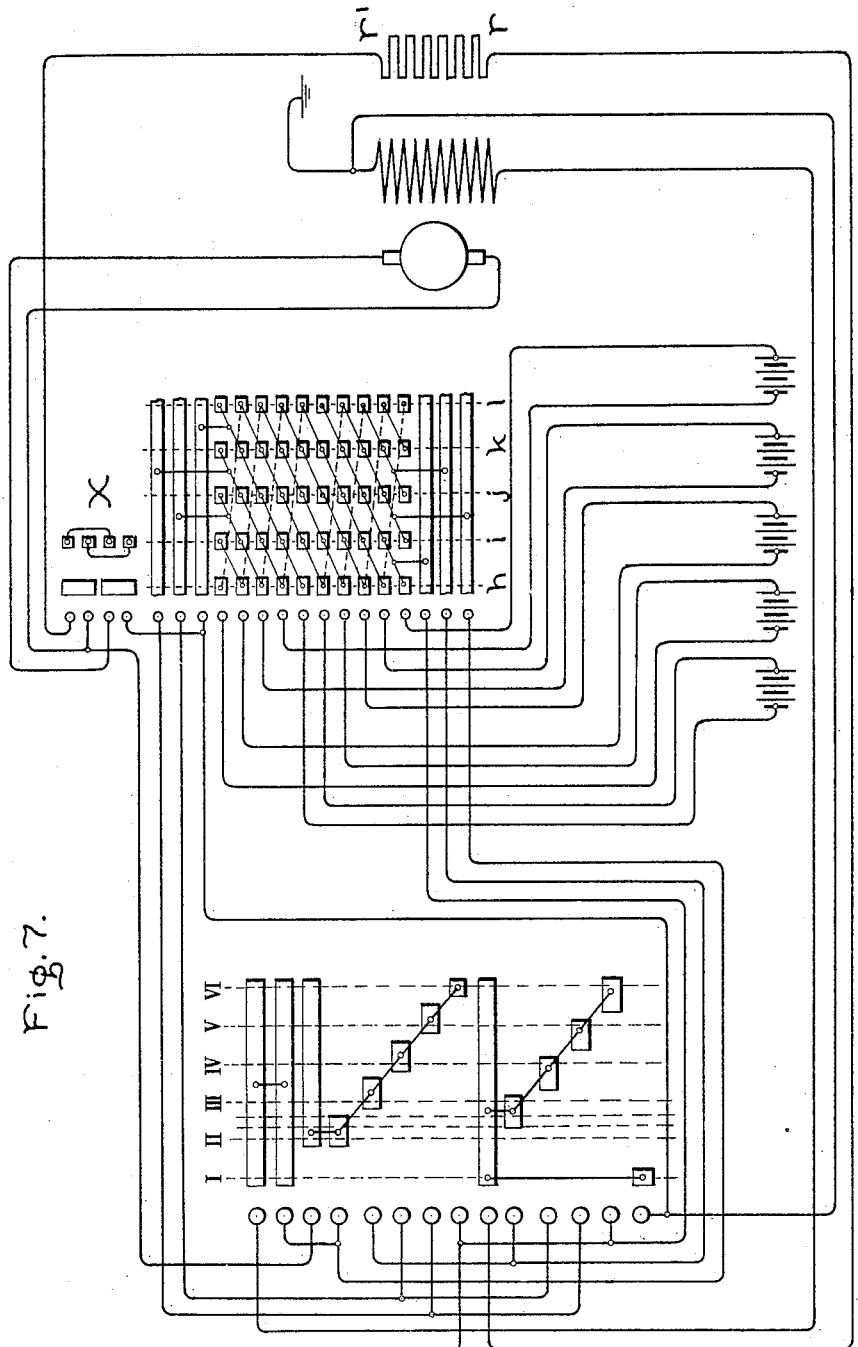

No. 635,139. Patented Oct. 17, 1899.
M. T. A. KUBIERSCHKY.
REGULATING ELECTRIC MOTORS.
(Application filed Aug. 4, 1899.)
(No Model.) 3 Sheets—Sheet 1.
Fig. 1.
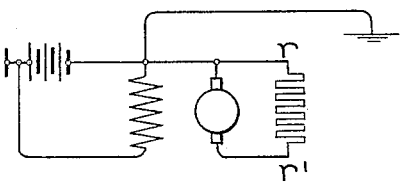
Fig. 2.
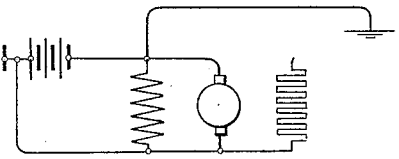
Fig. 3.
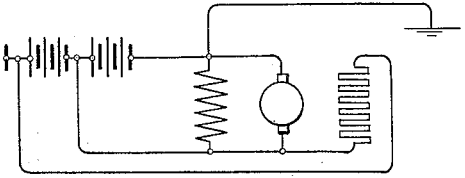
Fig. 4.
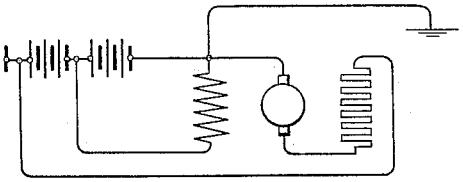
Fig. 5.
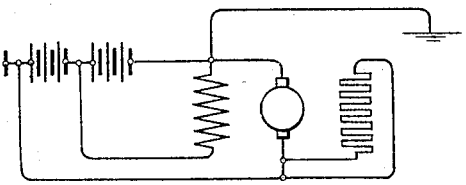
Fig. 6.
Witnesses.
Edward Williams, Jr.
Benjamin B. Hull
Inventor.
Martin T. A. Kubierschky.
by Albert G. Davis
Atty.

No. 635,139. Patented Oct. 17, 1899.
M. T. A. KUBIERSCHKY.
REGULATING ELECTRIC MOTORS.
(Application filed Aug. 4, 1899.)
(No Model.) 3 Sheets—Sheet 2.

Witnesses.
Edward Williams, Jr.
Benjamin B Hull

Inventor.
Martin T. A. Kubierschky
by Albert G Davis
Atty.

No. 635,139. Patented Oct. 17, 1899.
M. T. A. KUBIERSCHKY.
REGULATING ELECTRIC MOTORS.
(Application filed Aug. 4, 1899.)
(No Model.) 3 Sheets—Sheet 3.

Witnesses.
Edward Williams, Jr.

Inventor.
Martin T. A. Kubierschky.
by Albert G. Davis
Atty.

UNITED STATES PATENT OFFICE.

MARTIN T. A. KUBIERSCHKY, OF BERLIN, GERMANY.

REGULATING ELECTRIC MOTORS.

SPECIFICATION forming part of Letters Patent No. 635,139, dated October 17, 1899.

Application filed August 4, 1899. Serial No. 726,144. (No model.)

*To all whom it may concern:*

Be it known that I, MARTIN T. A. KUBIERSCHKY, a subject of the Emperor of Germany, residing at Berlin, Germany, have invented certain new and useful Improvements in Regulating Electric Motors, (Case No. 924,) of which the following is a specification.

The series motors which are at present almost universally used for street-railway traction have two defects. In the first place when starting the cars a great deal of electrical energy is always destroyed by the resistance, and in the second place mechanical energy is destroyed by the useless working of the brake when braking on level roads or on descending grades. The losses caused by the resistances were partially prevented or at least lessened during the first few years of street-railway work by the series-parallel method of control. The large braking losses, compared with the total power consumption, have, however, lately caused engineers to give this subject more serious attention and have led to a number of proposals more or less worthy of notice. The simple conversion of the shunt-motor into a dynamo therefore leads to its use on street-railways, and the shunt-motor has really in isolated cases been employed for high-grade railways. The disadvantages of using a shunt-motor alone were, however, soon recognized, and the simultaneous use of transportable secondary batteries having in the meantime become more general endeavors were made to secure all the advantages of the shunt-motor without having its disadvantages by separately exciting the field-winding with a small secondary battery and not from the line-voltage. A really profitable recovery of the momentum of the cars is, however, only partially obtained by the methods now known, because with the aid of these methods of control on descending grades a considerable portion of the work consumed in elevating may be regained, whereas on stopping very little energy indeed is recovered. The terminal voltage of the armature of a shunt or separately-excited dynamo at constant field excitation being directly proportional to the number of turns, the voltage when braking or lowering the speed can only, therefore, be kept higher than the line-voltage by intensifying the field. This field intensity, however, without taking into consideration the means available for producing it, soon attains in practice a certain limit, so that when stopping nothing more can be done after the slowest speed is attained than to brake off the remainder of the kinetic energy. The method described below aims at the removal of this disadvantage and at the same time is intended to prevent to a great extent the losses due to the starting resistances. The fundamental idea of this method is to at first feed the armature of the motor when starting with low electromotive force and to gradually increase the latter until it becomes equal to the line-voltage. When stopping, the electromotive force counteracting the armature-voltage is then gradually lessened, and thus enables the armature to produce energy until just before stopping. In order to put this idea into practice, a secondary battery is necessary, which is frequently employed in mixed systems of traction and can also be used with advantage on elevated and ordinary railways.

In the following description it is assumed, for the sake of example only, that the battery is divided into five groups. The battery can, however, be of course subdivided into any number of groups, according to requirements.

Figure 8:
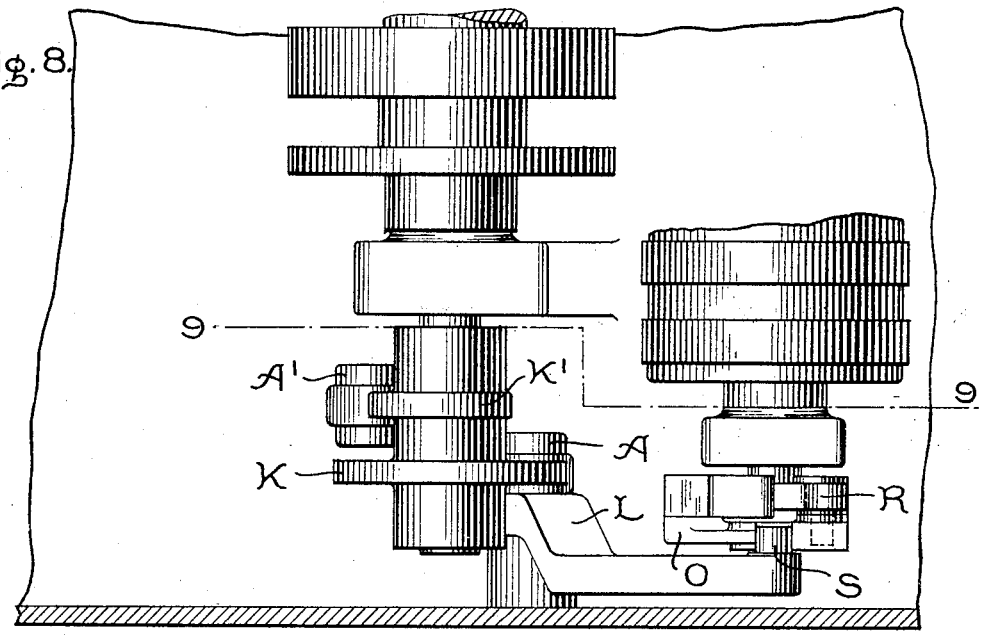
Figure 9:
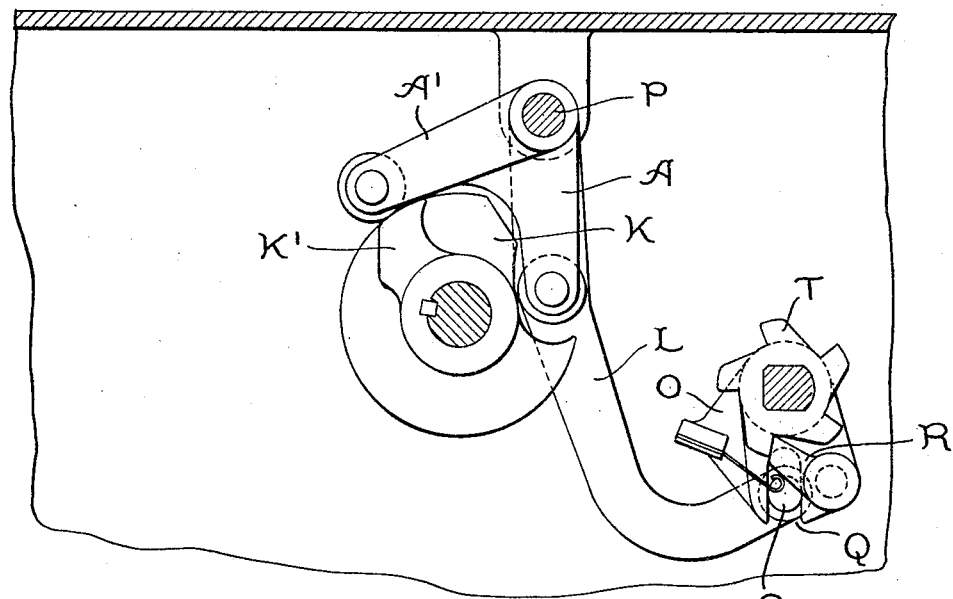

Figures 1 to 6, inclusive, represent connections corresponding to different controller positions. Fig. 7 shows a development of the main controller-cylinder and of the battery-switch, together with the connections coöperating therewith; and Figs. 8 and 9 are representations in elevation and plan, respectively, of a device for giving step-by-step movement to the battery-switch.

Before proceeding to a detailed explanation of the controller and its connections a brief description of the combinations of circuits shown in Figs. 1 to 6, inclusive, will be useful. When the controller is at its off position, the groups of batteries shown are connected in series between trolley and ground and are thus being charged. At the first controller position (indicated in Fig. 1) the armature of the motor is closed upon the resistances $r\ r'$, while its field is connected across one of the groups of batteries. This connection represents the braking connection for the motor when it is being brought to rest, but has no function when the motor is being started. As the controller-switch is turned the resistance is cut out and the armature connected in shunt to the field. This represents the first running position of the controller. A further movement of the controller causes the free end of the resistance (indicated in Fig. 2) to be connected across an adjacent group of battery-cells, this connection being a transition step to the subsequent position, (represented in Fig. 4,) in which the armature, with the resistance in series, is connected across two groups of battery-cells, while the field remains connected, as before. The next step consists in cutting out the resistance, as indicated in Fig. 5, while the subsequent steps are repetitions of the foregoing ones until the final position of the controller-cylinder is reached, when, as shown in Fig. 6, the armature is connected directly between trolley and ground and receives the full-line potential. In bringing the motor to rest the same operations are gone through with, but in the reverse order. When on downgrades or under other conditions which cause the motor to act as a generator, it will be observed that by reason of the connections thus made possible the potential opposed to that generated by the motor may always be rendered such as to cause the motor to feed back current through the storage batteries to line. With this arrangement, however, it will be noted that from the time the motor is started from rest until the time when the controller is brought back to its off position the field of the motor is being continually excited by the same group of storage cells, thus causing a considerable inequality between the charging and discharging of that group and of the remaining groups. To obviate this objection, I make use of a battery-switch, the function of which is to cause the different groups of cells to be used in rotation to excite the motor-field, the changes and connections being effected each time the controller is brought back to its off position.

In Fig. 7 the battery-switch is shown at the right, while the main controller-switch is shown at the left, both switches being indicated by a diagrammatic development of their contacts and contact-fingers. For convenience the contact-fingers coöperating with the battery-switch are shown as disconnected therefrom; but in practice the fingers will always rest upon some one of the vertical sets of contacts through which the dotted lines $h\ i\ j\ k\ l$ are passed. These vertically-arranged contacts are cross-connected, as indicated, with leads brought out and connected with two sets of rings—three each in number—from which sliding connections lead to contact-fingers on the main controller. Connections from the battery lead to contact-fingers which coöperate with the vertically-arranged contacts of the battery-switch.

Supposing now the development of the main cylinder to be slid from right to left under the row of contact-fingers, it can be easily seen that the connections shown in Figs. 1 to 6 will be made one after another in their turn—that is, the field will be almost constantly excited by one battery group, while the armature is connected in series successively with one, two, three, and four groups and finally receives the line-voltage direct. At this position (VI) of the controller the car attains its greatest speed, which speed can still be increased by weakening the field-excitation with resistances. This weakening of the field-excitation is not shown in the drawings, as it has really nothing to do with the invention, the process being well known.

As now the magnet-field of the motor is constantly excited at every running position of the controller, while the armature at the same time works against an electromotive force which is different for each point of the controller, every running position of the controller really corresponds to a certain speed, and it is not necessary when running at low speed to introduce resistances, as was the case in all former systems. In order to reduce the speed thus obtained or to stop the car with the system proposed here, all that has to be done is to slowly turn back the controller-handle toward O, which causes the electromotive force of the armature to exceed the voltage available for any one of the driving-points, and consequently to produce energy for the charging of the battery or to give off current to the main conductor (on simultaneously braking the car) in proportion to the intensity of current delivered. In this manner power is regained from the energy in the car until (at controller position II) the slowest speed is attained. In order now to stop the car, position I is used, in which, as shown in Fig. 1, the armature is short-circuited over a resistance, the field remaining excited as before. In this position, therefore, no energy is regained; but there is, however, very little loss, as only a very small quantity of the kinetic energy which is left is destroyed in this manner.

In employing the above-mentioned connection the different groups of accumulators work unequally at slow speeds and also when starting, and this inequality is only partially counterbalanced by the charge they receive when braking. In order to compensate for this inequality, the battery-switch described above is so coupled with the driving and braking cylinder that when the latter is turned from position I to "off" the former is automatically shifted forward a fifth of its whole circumference every time. Any mechanical method of a kinetical nature may be employed to attain this end, one of these methods being shown in Figs. 8 and 9.

The spindle of the main controller carries two cams $K\ K'$, which coöperate, respectively, with rollers affixed to the arms $A\ A'$ of a bell-crank lever suitably pivoted to a part of the controller-casing by means of a shaft P, to which is attached a lever L. The battery-switch is located adjacent to the main controller-switch, and upon its shaft carries a loosely-mounted plate O, provided with a slot (indicated at Q) and having a pawl R pivoted to its upper side. A pin S, secured to the end of the lever L, coöperates with the sides of the slot Q and serves to partially rotate the plate O as the lever L is moved about its shaft P. A ratchet T is fixed to the shaft of the battery-switch and is operated upon by the ratchet R, the free end of which is suitably spring-pressed against the teeth of the ratchet. The parts are so organized and correlated that as the main controller-shaft is moved from its zero or off position the arm L is moved toward the right, so as to cause the pawl R to slip over one of the teeth of the ratchet-wheel T. The main controller may then be turned to its final position without producing any further motion of the lever-arms and ratchet. When, however, the main controller is turned back to its off position the reverse operation takes place, thus causing the battery-switch to be rotated through a limited arc corresponding in this particular instance to one-fifth of its circumference, thus causing the contact-fingers of the battery-switch to move from one set of contacts to the set next succeeding.

The connections diagrammatically shown permit only one direction for running the motor, so that in order to obtain motion in the opposite direction I provide a reversing-switch, (indicated at X,) the character of which will be readily understood by those skilled in the art without further explanation.

What I claim as new, and desire to secure by Letters Patent of the United States, is—

1. The combination of a circuit of substantially constant potential, two sources of current of inversely-variable electromotive force, means for combining said electromotive forces, and means for impressing the resultant electromotive force on said circuit.

2. The combination of a momentum-driven generator, a separate source of electromotive force, means for combining said electromotive force with that of the generator, and means for varying said electromotive force.

3. The combination of a momentum-driven generator, a source of electromotive force in series with the generator and variable inversely with the electromotive force of the generator, and a circuit across which the generator and said source of electromotive force are connected.

4. The combination of a generator of varying electromotive force, storage batteries in series therewith, a constant-potential circuit across which the generator and storage batteries are connected and means for varying the number of cells of battery at will.

5. The combination of a generator of varying electromotive force, a storage battery in series therewith and means for varying the electromotive force of the battery inversely with that of the generator.

6. The combination of a dynamo-electric machine, a storage battery comprising groups of cells, mains between which the battery is connected, electrical connections between said machine and one or more of said groups and a switch for shifting said electrical connections to another group or groups of cells.

7. The combination of a dynamo-electric machine, a storage battery combining groups of cells, constant-potential mains between which the battery is connected, electrical connections between the field of said machine and one of said groups of cells and means for changing the connections of the battery from one group of cells to another.

8. The combination of a dynamo-electric machine, a storage battery comprising groups of cells, mains between which the battery is connected, electrical connections between the field of said machine and one of said groups, and a controlling-switch for changing the connections of one group of cells to another when the controlling-switch is turned to its off position.

9. The combination of a constant-potential circuit, a storage battery connected across said circuit, and a dynamo-electric machine having its field and armature arranged to be separately connected across different numbers of cells of said battery.

In witness whereof I have hereunto set my hand this 17th day of June, 1899.

MARTIN T. A. KUBIERSCHKY.

Witnesses:
WALDEMAR HAUPT,
HENRY HASPER.